(12) United States Patent
Oohashi (10) Patent No.: US 12,106,775 B2
(45) Date of Patent: Oct. 1, 2024

(54) RECORDING AND REPRODUCING DEVICE WITH MEDIUM REGULATING PORTION

(71) Applicant: Resonac Corporation, Tokyo (JP)

(72) Inventor: Fuminobu Oohashi, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/460,989

(22) Filed: Sep. 5, 2023

(65) Prior Publication Data

US 2024/0079029 A1 Mar. 7, 2024

(30) Foreign Application Priority Data

Sep. 6, 2022 (JP) ................................ 2022-141267

(51) Int. Cl.
*G11B 25/04* (2006.01)
*G11B 33/08* (2006.01)
*G11B 5/53* (2006.01)

(52) U.S. Cl.
CPC ............ *G11B 25/043* (2013.01); *G11B 33/08* (2013.01); *G11B 5/532* (2013.01)

(58) Field of Classification Search
None
See application file for complete search history.

(56) References Cited

U.S. PATENT DOCUMENTS

| | | | | |
|---|---|---|---|---|
| 5,801,899 A | * | 9/1998 | Genheimer | G11B 25/043 360/97.2 |
| 6,055,134 A | * | 4/2000 | Boutaghou | G11B 33/08 360/254.4 |
| 6,134,076 A | * | 10/2000 | Boutaghou et al. | G11B 21/22 360/254.5 |
| 6,212,029 B1 | * | 4/2001 | Fioravanti | G11B 25/043 360/97.2 |
| 2001/0012174 A1 | * | 8/2001 | Imamura | G11B 25/043 360/97.19 |
| 2002/0131212 A1 | * | 9/2002 | Yanagihara-Shi | G11B 21/22 360/254.8 |

(Continued)

FOREIGN PATENT DOCUMENTS

JP 11-306729 A 11/1999
JP 2000-149493 A 5/2000

(Continued)

*Primary Examiner* — Craig A. Renner
(74) *Attorney, Agent, or Firm* — Sughrue Mion, PLLC (57) ABSTRACT

A recording and reproducing device including, a case; at least one recording medium having a disk-shape, a motor configured to rotate the at least one recording medium, a head configured to read or write information from or to the at least one recording medium, and an actuator configured to drive the head to scan in a radial direction of the at least one recording medium which are provided in the case; and a regulating portion configured to, when an external shock is applied to the at least one recording medium, contact an outer peripheral edge of the at least one recording medium to regulate displacements of the at least one recording medium due to bending of the at least one recording medium, wherein the regulating portion includes a regulating member which is movable in an axial direction parallel to a rotation axis of the at least one recording medium.

9 Claims, 8 Drawing Sheets

(56) References Cited

U.S. PATENT DOCUMENTS

| | | | |
|---|---|---|---|
| 2009/0213499 A1* | 8/2009 | Yamamoto et al. | G11B 21/22 360/250 |
| 2021/0272603 A1* | 9/2021 | Uehara et al. | G11B 33/1446 |
| 2021/0407538 A1* | 12/2021 | Herdendorf et al. | G11B 21/22 |

FOREIGN PATENT DOCUMENTS

| | | |
|---|---|---|
| JP | 2000-268531 A | 9/2000 |
| JP | 2001-101814 A | 4/2001 |
| JP | 2021-108234 A | 7/2021 |
| WO | 2011/121904 A1 | 10/2011 |

* cited by examiner

RECORDING AND REPRODUCING DEVICE WITH MEDIUM REGULATING PORTION

CROSS-REFERENCE TO RELATED APPLICATION

Priority is claimed on Japanese Patent Application No. 2022-141267, filed Sep. 6, 2022, the content of which is incorporated herein by reference.

BACKGROUND OF THE INVENTION

Field of the Invention

The present invention relates to a recording and reproducing device.

Description of Related Art

A hard disk drive (HDD) is a recording and reproducing device capable of storing a large amount of information. Such a recording and reproducing device includes, within a case, a plurality of disks (disk-shaped recording media), a spindle motor that rotates the plurality of disks, heads attached to distal ends of a plurality of suspension arms, and a voice coil motor that drives the heads to scan in a radial direction of the disks, and writes (records) or reads (reproduces) information to or from the disks through the heads that scan the surfaces of the disks while rotating the disks.

Incidentally, for HDDs, attempts have been made to increase the number of disks that can be housed within a case in order to increase the storage capacity per one standardized HDD. Also, the distances between adjacent disks and the distances between the disks and other parts in HDDs have become narrower as the devices have become smaller.

On the other hand, the thicknesses of known 3.5-inch disks are about 1.27 mm. In this case, a standardized 3.5-inch HDD houses up to five disks within a case. Also, in recent HDDs, the thickness of each disk has been reduced and five or more disks have been housed within a case to increase the capacity.

However, when the thicknesses of disks are reduced, the rigidity of the disks decreases, such that they tend to bend when a strong external shock or vibration is applied to the HDD. In this case, contact between adjacent disks or contact between a disk and other parts increases the possibility of damaging the recording surfaces of the disks. Also, the recording density of recent recording medium is high and thus a large amount of recording capacity is lost even if a small portion of the recording surface is damaged.

Therefore, a regulating member which, when an external shock is applied to a recording medium, contacts an outer peripheral edge of the recording medium to regulate displacements of the recording medium due to bending of the recording medium is provided to solve such a problem (see, for example, Patent Documents 1 to 6 below).

PATENT DOCUMENTS

[Patent Document 1] Japanese Unexamined Patent Application, First Publication No. H11-306729
[Patent Document 2] PCT International Publication No. 2011/121904
[Patent Document 3] Japanese Unexamined Patent Application, First Publication No. 2000-149493
[Patent Document 4] Japanese Unexamined Patent Application, First Publication No. 2000-268531
[Patent Document 5] Japanese Unexamined Patent Application, First Publication No. 2001-101814
[Patent Document 6] Japanese Unexamined Patent Application, First Publication No. 2021-108234

SUMMARY OF THE INVENTION

However, even when such a regulating member is provided, if the regulating member and the recording medium come into contact with each other, there is a possibility that the contact portions may be scraped off by rubbing and generate debris or dust. Also, if debris or dust generated within the case adheres to the disks, heads, or the like, there is a possibility that their functions will be adversely affected.

The present invention has been proposed in view of such conventional circumstances and it is an object of the present invention to provide a recording and reproducing device which protects a recording medium against external shocks and reduces the generation of debris or dust due to parts of the recording medium being scraped off.

To achieve the above object, the present invention provides the following device.

(1) A recording and reproducing device including, within a case; at least one recording medium having a disk-shape, a motor configured to rotate the at least one recording medium, a head configured to read or write information from or to the at least one recording medium, and an actuator configured to drive the head to scan in a radial direction of the at least one recording medium which are provided in the case; and a regulating portion configured to, when an external shock is applied to the at least one recording medium, contact an outer peripheral edge of the at least one recording medium to regulate displacements of the at least one recording medium due to bending of the at least one recording medium, wherein the regulating portion includes a regulating member which is movable in an axial direction parallel to a rotation axis of the at least one recording medium.

(2) The recording and reproducing device according to (1) above, wherein the regulating member has a pair of contact surfaces facing the outer peripheral edge of the at least one recording medium, and the pair of contact surfaces are inclined in opposite directions with the outer peripheral edge of the at least one recording medium interposed therebetween.

(3) The recording and reproducing device according to (2) above, wherein the at least one recording medium includes a plurality of recording medium, the plurality of recording medium are arranged in the axial direction parallel to the rotation axis of the at least one recording medium, the pair of contact surfaces includes a plurality of pairs of contact surfaces, and each of the plurality of pairs of contact surfaces is arranged on the outer peripheral edge of the regulating member in the axial direction corresponding to each of the plurality of recording medium.

(4) The recording and reproducing device according to (2) above, wherein the recording medium includes a plurality of recording medium, the plurality of recording medium are arranged in the axial direction parallel to the rotation axis of the at least one recording medium, the regulating member includes a plurality of regulating members, and each of the plurality of regulating members is arranged in the axial direction corresponding to each of the plurality of recording medium.

(5) The recording and reproducing device according to (1) above, wherein the regulating portion includes an energizing member configured to energize the regulating member toward one side in the axial direction parallel to the rotation axis of the at least one recording medium.

(6) The recording and reproducing device according to (1) above, wherein the regulating member is pivotally supported by a support shaft parallel to the rotation axis of the at least one recording medium.

(7) The recording and reproducing device according to (1) above, wherein the regulating portion includes a plurality of regulating portions, and each of the plurality of regulating portions is provided at each of a plurality of positions in a circumferential direction of the at least one recording medium.

(8) The recording and reproducing device according to (1) above, wherein the at least one recording medium has a diameter of 90 mm or more and a thickness of 0.550 mm or less.

According to the present invention, it is possible to provide a recording and reproducing device that protects the recording medium against external shocks and reduces the generation of debris or dust due to parts of the recording medium being scraped off as described above.

DETAILED DESCRIPTION OF THE INVENTION

Hereinafter, embodiments of the present invention will be described in detail with reference to the drawings.

In the drawings used in the following description, to make features easy to understand, portions corresponding to the features are sometimes shown in an enlarged form for the sake of convenience and the dimensional ratios and the like of components are not always the same as the actual ones. Materials, dimensions, and the like exemplified in the following description are also examples, to which the present invention is not necessarily limited, and can be appropriately modified and implemented without departing from the spirit of the invention.

First, for example, a recording and reproducing device 1 shown in FIGS. 1 to 3 will be described as an embodiment of the present invention.

Figure 1:
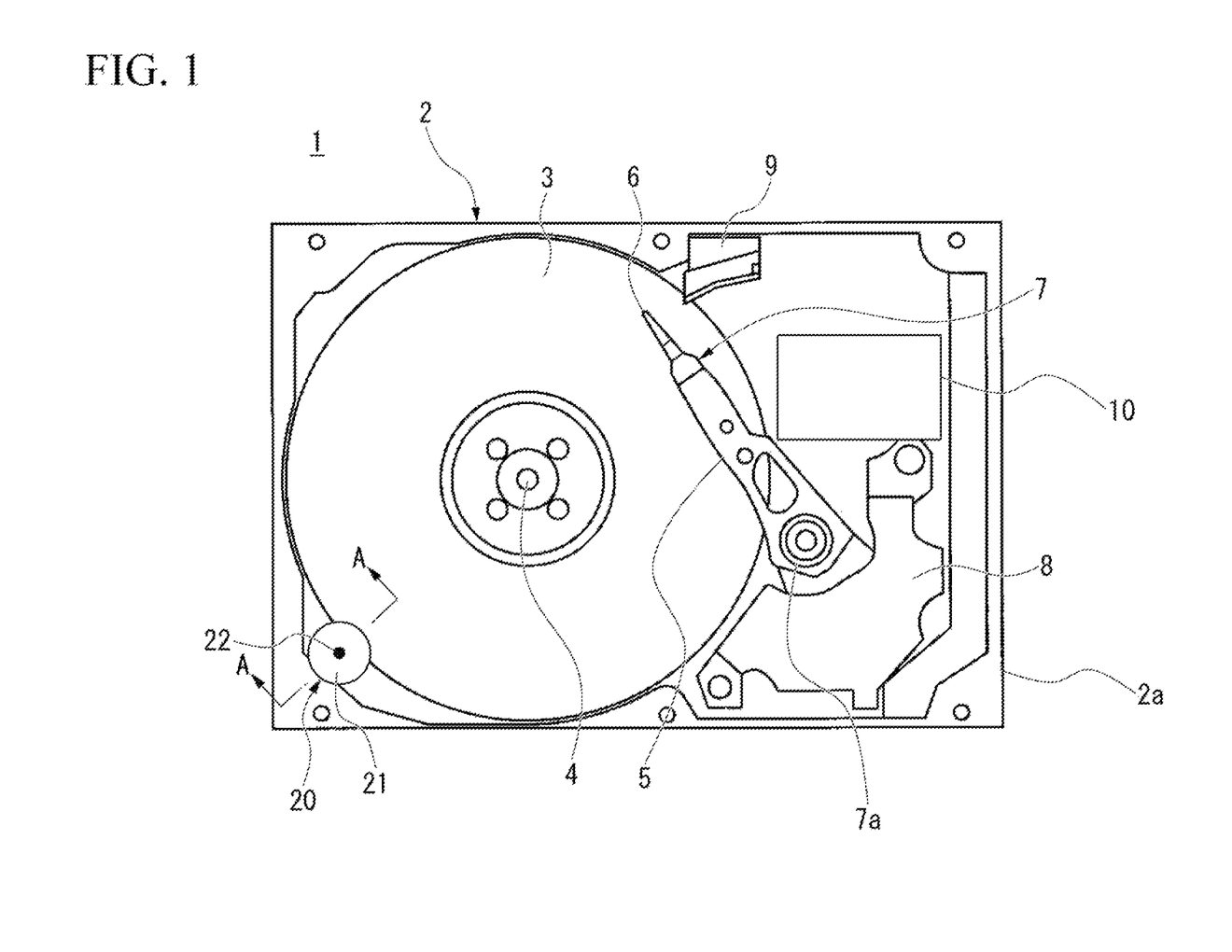
FIG. 1 is a plan view showing a configuration of a recording and reproducing device according to an embodiment of the present invention.

FIG. 1 is a plan view showing a configuration of the recording and reproducing device 1. FIG. 2 is a cross-sectional view showing a configuration of a regulating portion 20 taken along line A-A shown in FIG. 1. FIG. 3 is a cross-sectional view showing a state where disks 3 are in contact with a regulating member 21.

The recording and reproducing device 1 of the present embodiment is a device which applies the present invention to a hard disk drive (HDD) that magnetically stores information.

Figure 2:
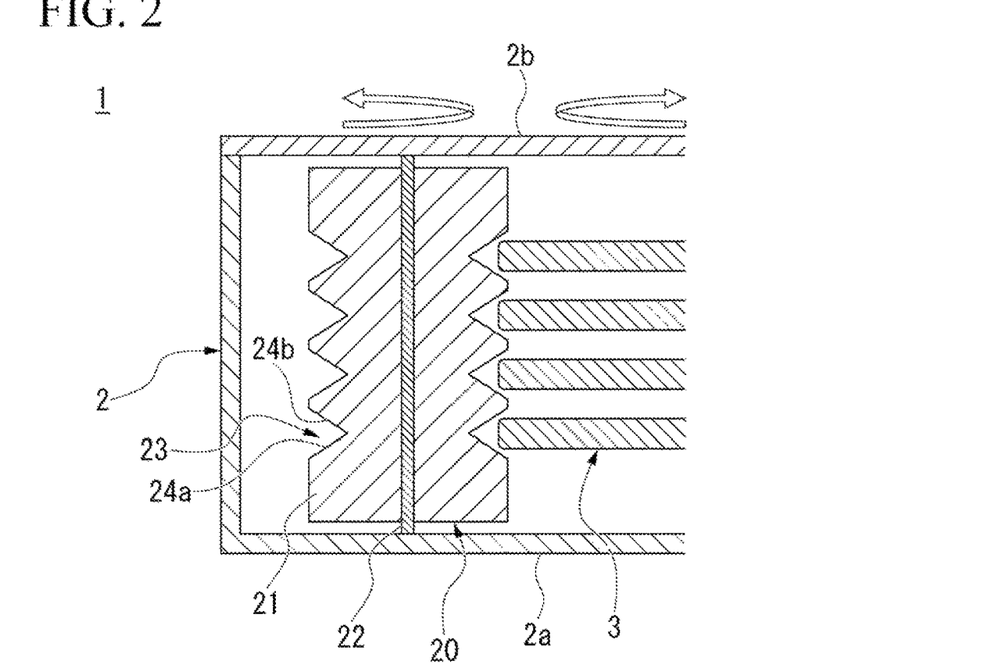
FIG. 2 is a cross-sectional view showing a configuration of a regulating portion taken along line A-A shown in FIG. 1.

Specifically, as shown in FIGS. 1 and 2, the recording and reproducing device 1 includes a case 2; and a plurality of the disks 3, a spindle motor 4 that rotates the plurality of (four in the present embodiment) disks 3, head assemblies 7 in which each of heads 6 is attached to distal ends of each of a plurality of (eight in the present embodiment) suspension arms 5, a head actuator 8 that drives the heads 6 to scan in a radial direction of the disks 3, a ramp 9 that allows the heads 6 to retract from surfaces of the disks 3, and a control unit 10 that controls the components are provided in the case 2.

The case 2 forms a space for housing the components inside when a lid 2b that closes a top opening of a case body 2a is attached to the case body 2a which is formed in the shape of a rectangular frame with a bottom.

Each disk 3 is a disk-shaped recording medium having a central hole and is attached to a rotation axis of the spindle motor 4. The disk 3 has a plurality of layers including a magnetic layer formed on each surface of a base material such as glass, aluminum, or aluminum alloy.

The plurality of disks 3 are provided arranged in an axial direction parallel to the rotation axis of the at least one recording medium at regular intervals. In addition, the plurality of disks 3 have the same outer shape in a plane view. The number of disks 3 is not limited to two or more and may be one.

The spindle motor 4 is a thin motor for HDDs and rotates the plurality of disks 3 integrally while holding the central holes of the plurality of disks 3 arranged in the axial direction.

The head assembly 7 is rotatably supported via a rotation shaft 7a provided on a base end side of the plurality of suspension arms 5 arranged in the axial direction.

The head actuator 8 consists of, for example, a voice coil motor, is provided on a base end 1 side of the head assembly 7 across the rotation shaft 7a, and that rotates the head assembly 7. Thereby, the heads 6 attached to the distal ends of the suspension arms 5 can scan the disks 3 in the radial direction.

The ramp 9 is positioned radially outward of the disks 3 and forms a slope for retracting the heads 6 from the surfaces of the disks 3. Thereby, the heads 6 can be positioned on the ramp 9 when the disks 3 are stopped and can be positioned above the surfaces of the disks 3 when the disks 3 are rotating.

While controlling the driving of the spindle motor 4 and the head assembly 7, the control unit 10 performs control for processing information received from the outside and sending recording signals to the heads 6, processing reproduction signals from the heads 6 and sending information to the outside, and the like.

In the recording and reproducing device 1 configured as described above, the heads 6 scan the surfaces of the disks 3 while the disks 3 are rotating, thereby writing (recording) or reading (reproducing) information to or from the disks 3. In the recording and reproducing device 1, the each of heads 6 attached to the distal end of the each of suspension arms 5 scan both sides of the plurality of disks 3 arranged in the axial direction. Thereby, information is magnetically written (recorded) or read (reproduced) to or from both sides of each disk 3.

Incidentally, as shown in FIGS. 1 and 2, the recording and reproducing device 1 of the present embodiment includes the regulating portion 20 that, when an external shock, vibration, or the like is applied to a disk 3, contacts an outer peripheral edge of the disk 3 to regulate displacements of the disk 3 due to bending of the disk 3.

The regulating portion 20 is provided at a position in the circumferential direction of the disks 3 where it can come into contact with and separate from the outer peripheral edges of the disks 3. In the present embodiment, the regulating portion 20 is provided inside the case body 2a at one corner thereof that faces the outer peripheral edges of the disks 3.

The regulating portion 20 includes a regulating member 21 that is rotatable about an axis parallel to the rotation axis of the disks 3. Although the material of the regulating member 21 is not limited, it is made of, for example, a low-friction member such as an acetal resin (POM), a polyamide resin (such as MC nylon (registered trademark)), or a fluorine resin (such as Teflon (registered trademark)) and is formed in the shape of a cylindrical roller.

The regulating member 21 is provided to be rotatable about an axis parallel to the rotation axis of the disk 3 by being pivotally supported by a support shaft 22 axially penetrating a central portion of the regulating member 21. The support shaft 22 is attached to the case body 2a. The support shaft 22 may be attached to the case body 2a through other parts.

It is preferable to provide lubricity to a sliding portion between the regulating member 21 and the support shaft 22 in the regulating portion 20 in order to facilitate rotation of the regulating member 21. In order to provide lubricity to the sliding portion, for example, at least one of the regulating member 21 and the support shaft 22 is made of a self-lubricating material (see the low-friction member above) or grease or the like is applied to the sliding portion between the regulating member 21 and the support shaft 22. Of these, the former is preferable in that the assembly process is simple and the inside of the case 2 can be less contaminated.

Each of a plurality of (four in the present embodiment) grooves 23 corresponding to each of the plurality of disks 3 arranged in the axial direction is arranged on an outer peripheral surface of the regulating member 21 in the axial direction. The grooves 23 are provided such that they are cut in the outer peripheral surface of the regulating member 21 in the circumferential direction along the entire circumference.

Each groove 23 has a pair of contact surfaces 24a and 24b that face the outer peripheral edge of the corresponding disk 3 and are inclined in opposite directions with the outer peripheral edge of the disk 3 interposed therebetween. That is, each of pairs of contact surfaces 24a and 24b corresponding to each of the plurality of disks arranged in the axial direction is arranged on the outer peripheral surface of the regulating member 21 in the axial direction.

As shown in FIG. 2, the disks 3 and the regulating member 21 of the regulating portion 20 are normally not in contact with each other. That is, the outer peripheral edge of each disk 3 is located between the pair of contact surfaces 24a and 24b (of the corresponding groove 23), and when the recording and reproducing device 1 is stationary, the outer peripheral edge of the disk 3 is arranged to overlap the pair of contact surfaces 24a and 24b in a plane view while being vertically separated from the pair of contact surfaces 24a and 24b.

Figure 3:
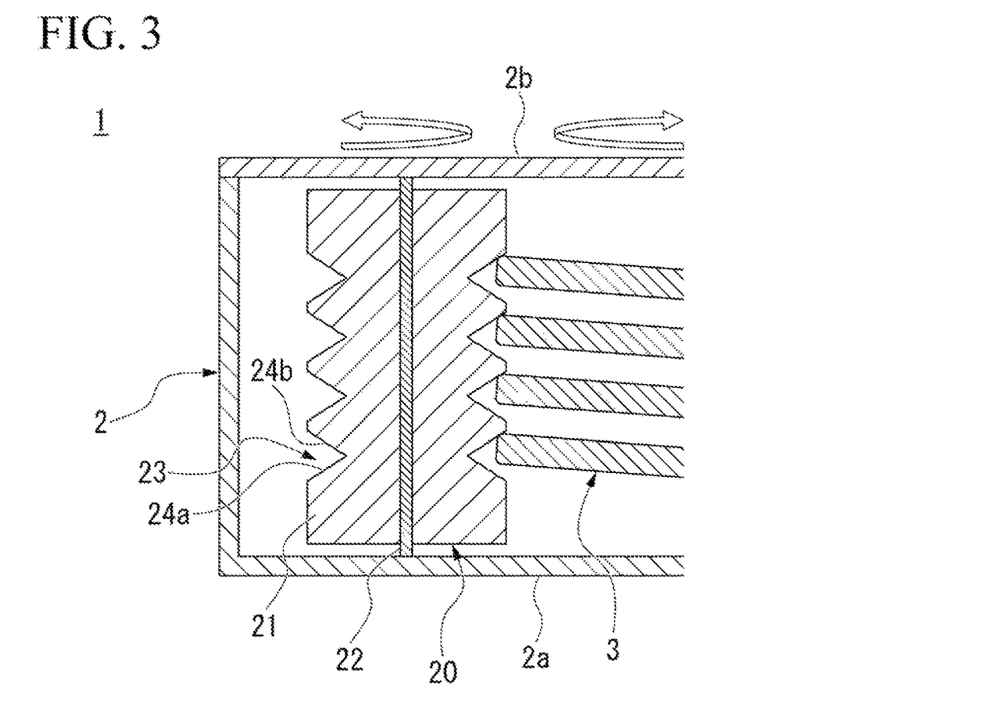
FIG. 3 is a cross-sectional view showing a state in which disks are in contact with a regulating member.

On the other hand, when a strong external shock or vibration is applied to the disks 3 as shown in FIG. 3, the disks 3 are bent such that the outer peripheral edges of the disks 3 are brought into contact with the regulating member 21 in the regulating portion 20.

At this time, the outer peripheral edge of each rotating disk 3 contacts one of the corresponding pair of contact surfaces 24a and 24b, whereby the regulating member 21 rotates in the opposite direction to the disks 3 while following the rotation of the disks 3.

As a result, the regulating member 21 in contact with the outer peripheral edges of the disks 3 can prevent contact between adjacent disks 3 and contact between the disks 3 and other parts while regulating displacements of the disks 3 due to bending of the disks 3.

Also, when the regulating member 21 comes into contact with the outer peripheral edges of the disks 3, the regulating member 21 rotates following the rotation of the disks 3, whereby it is possible to reduce the generation of debris or dust from the contact portions while reducing the rubbing of the regulating member 21 and the disks 3 against each other. It is also possible to suppress a reduction in the rotation speed of the disks 3 due to the rubbing of the regulating member 21 and the disks against each other.

As described above, the recording and reproducing device 1 of the present embodiment is provided with the regulating portion 20 described above, whereby it is possible to protect the disks 3 against external shocks, vibrations, or the like and reduce the generation of debris or dust due to parts of the disks 3 being scraped off.

The regulating member 21 in contact with the disks 3 may not rotate if the pressure due to the contact of the outer peripheral edges of the disks 3 with the regulating member 21 is small. In this case, generation of debris or dust from the contact portions is reduced because the friction acting on the contact portions of the disks 3 is small.

When the regulating member 21 in contact with the outer peripheral edges of the disks 3 rotates, a rotation difference may occur between the regulating member 21 and the disks 3. In this case, generation of debris or dust from the contact portions is reduced because the rotation difference is smaller than when the rotating disks 3 contact the stationary regulating member 21.

Incidentally, if the disk 3 has a large diameter and a small thickness, it is likely to be bent by acceleration in the vertical direction and this deformation of the disk 3 increases vertical movements of the outer peripheral edge. Therefore, the effect of protecting the disks 3 against external shocks, vibrations, or the like, achieved by the regulating portion 20 described above, increases when the disk 3 has a large diameter and a small thickness.

The effect is particularly large, for example, when the disk 3 has a diameter of 90 mm or more and a thickness of 0.55 mm or less, but the diameter and thickness of the disk 3 are not necessarily limited to these. Also, the diameter of the disk 3 may be 94 mm or more. Also, the thickness of the disk 3 may be 0.425 mm or less.

The total thickness of layers including magnetic layers formed on the front and back surfaces of the base material of the disk 3 is generally not more than 10% of the thickness of the base material, but it may be not more than 7.0% or not more than 5.0%. Also, the total thickness of layers is generally not less than 1.0% of the thickness of the base material, but it may be not less than 3.0% or not less than 4.0%.

The rigidity of the disk 3 largely depends on the Young's modulus of the base material. When the base material is an aluminum alloy, the Young's modulus of the base material is preferably 70 GPa or more, more preferably 73 GPa or more. An aluminum alloy having a Young's modulus of 75 GPa or more may sometimes be used.

In addition, a curve (of corner R) is formed between the front and side surfaces and between the back and side surfaces at the outer peripheral edge of the disk 3. Although the radius R of the curve is not particularly limited, it is preferable that $R \geq 0.10t$, more preferably $R \geq 0.20t$, with respect to the thickness t of the disk 3. It is also preferable that $R \leq 0.50t$, more preferably $R \leq 0.40t$, and even more preferably $R \leq 0.30t$.

This configuration increases the area of the contact portion between the disk 3 and the regulating member 21 and reduces the contact pressure therebetween, thereby reducing the generation of debris or dust from the contact portion.

The corners between the front and side surfaces of the disk 3 and between the back and side surfaces may be at right angles and may also be chamfered. When the corners are C-chamfered with a chamfer width C, it is preferable that $C \geq 0.10t$, more preferably $C \geq 0.20t$, and even more preferably $C \geq 0.30t$. Also, when the corners are chamfered with a chamfer width C, it is preferable that $C \leq 0.50t$, more preferably $C \leq 0.40t$, and even more preferably $C \leq 0.30t$.

Here, the shortest vertical distance between the disk 3 and the regulating member 21, which is the vertical distance between each of the pair of contact surfaces 24a and 24b forming the groove 23 and the outer peripheral edge of the disk 3, is preferably 3.0 μm or more, more preferably 10 μm or more. This is to suppress contact of the disk 3 with the regulating member 21 due to slight deformations of the disk 3 caused by rotating the disk 3, slight vibrations, shocks, or the like.

Also, the vertical distance between each of the contact surfaces 24a and 24b and the outer peripheral edge of the disk 3 is preferably 500 μm or less, more preferably 100 μm or less, and even more preferably 50 μm or less. This is to effectively limit deformations of the disk 3 in the vertical direction.

The present invention is not necessarily limited to the above embodiment and various modifications can be made without departing from the spirit of the present invention.

First Modification

Figure 4:
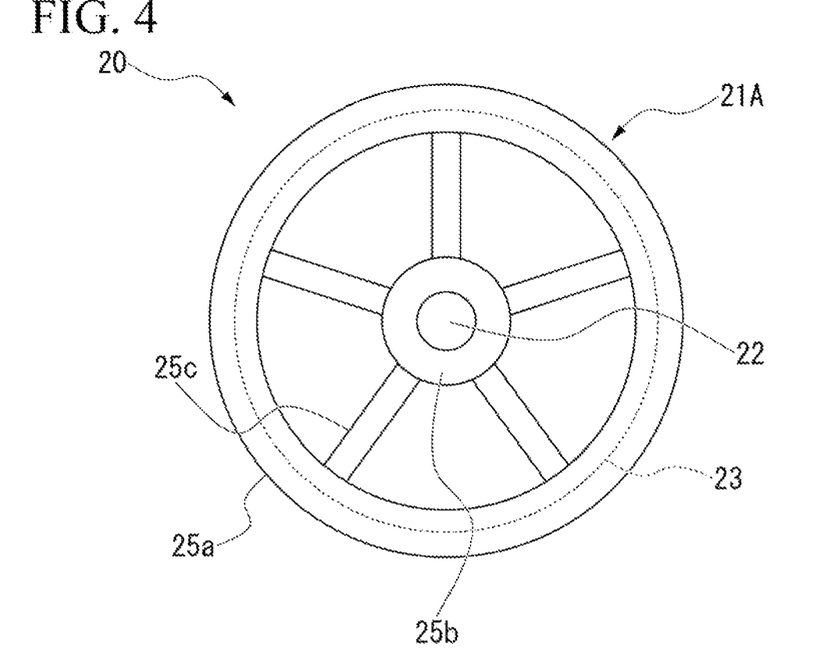
FIG. 4 is a plan view of a regulating portion shown as a first modification.

As a first modification, the regulating portion 20 may be configured to include, for example, a regulating member 21A as shown in FIG. 4. FIG. 4 is a plan view of the regulating portion 20 shown as the first modification.

The regulating member 21A has a hub-and-spoke structure instead of the cylindrical roller-shaped regulating member 21 described above. Specifically, the regulating member 21A includes a cylindrical roller portion 25a, a cylindrical hub portion 25b positioned at the center of the roller portion 25a, and a plurality of spoke portions 25c that radially connect the roller portion 25a and the hub portion 25b. The regulating member 21A is provided to be rotatable about an axis parallel to the rotation axis of the disk 3 by being pivotally supported by a support shaft 22 axially penetrating the hub portion 25b. Further, the plurality of grooves 23 having the pairs of contact surfaces 24a and 24b described above are arranged on the outer peripheral surface of the roller portion 25a in the axial direction.

The regulating member 21A can be lightened while maintaining strength. Also, the moment of inertia of the regulating member 21A is reduced. As a result, the regulating member 21A can better follow the rotation of the disk 3 when in contact with the disk 3 and can further increase the effect of reducing the generation of debris or dust from the contact portion.

Second Modification

Figure 5:
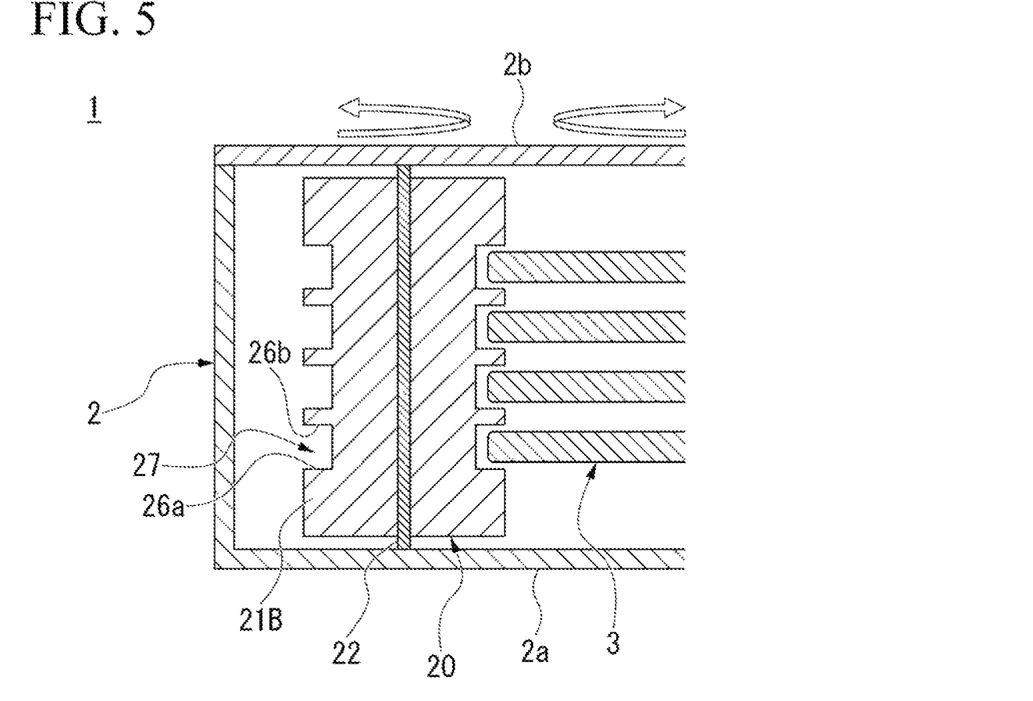
FIG. 5 is a cross-sectional view of a regulating portion shown as a second modification.

As a second modification, the regulating portion 20 may be configured to include, for example, a regulating member 21B as shown in FIG. 5. FIG. 5 is a cross-sectional view of the regulating portion 20 shown as the second modification.

Instead of the grooves 23, grooves 27, each of which has a pair of contact surfaces 26a and 26b that are parallel to each other with an outer peripheral edge of a corresponding disk 3 interposed therebetween, are provided on an outer peripheral surface of the regulating member 21B. A recording area of the disk 3 and the pair of contact surfaces 26a and 26b are arranged such that they do not overlap each other in a plane view.

This configuration can reduce fluctuations of the vertical distance between each of the pair of contact surfaces 26a and 26b forming the groove 27 and the outer peripheral edge of the disk 3 even if at least one of the disk 3 and the regulating member 21 is displaced in the horizontal direction due to dimensional tolerances and assembly tolerances of parts.

Third Modification

Figure 6:
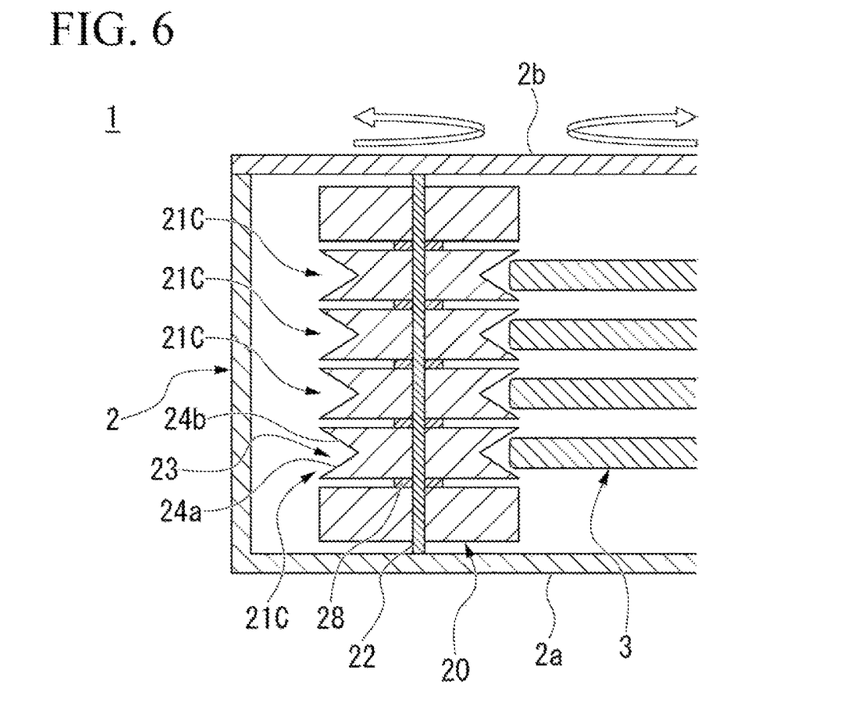
FIG. 6 is a cross-sectional view of a regulating portion shown as a third modification.

As a third modification, the regulating portion 20 may be configured to include, for example, a regulating member 21C as shown in FIG. 6. FIG. 6 is a cross-sectional view of the regulating portion 20 shown as the third modification.

Each of a plurality of regulating members 21C is arranged in the axial direction corresponding to each of the disks 3 arranged in the axial direction. A groove 23 having the pair of contact surfaces 24a and 24b is provided on an outer peripheral surface of each regulating member 21C. That is, the regulating members 21C are formed by dividing the regulating member 21 into parts corresponding to the grooves 23.

The plurality of regulating members 21C are provided to be rotatable independently of each other about an axis parallel to the rotation axis of the disk 3 by being pivotally supported by a support shaft 22 axially penetrating central portions of the regulating members 21C. Spacers 28 for adjusting the intervals between adjacent regulating members 21C are arranged between the adjacent regulating members 21C in each of the plurality of regulating members 21C.

According to this configuration, only a regulating member 21C in contact with an outer peripheral edge of a disk 3 can be rotated among the plurality of regulating members 21C. Because the moment of inertia of each regulating member 21C is small, the regulating member 21C can better follow the rotation of the disk 3 when in contact with the disk 3 and can further increase the effect of reducing the generation of debris of dust from the contact portion. According to this configuration, it is also possible to more effectively suppress a reduction in the rotation speed of the disk 3 due to the rubbing of the regulating member 21C and the disk 3 against each other.

Fourth Modification

Figure 7:
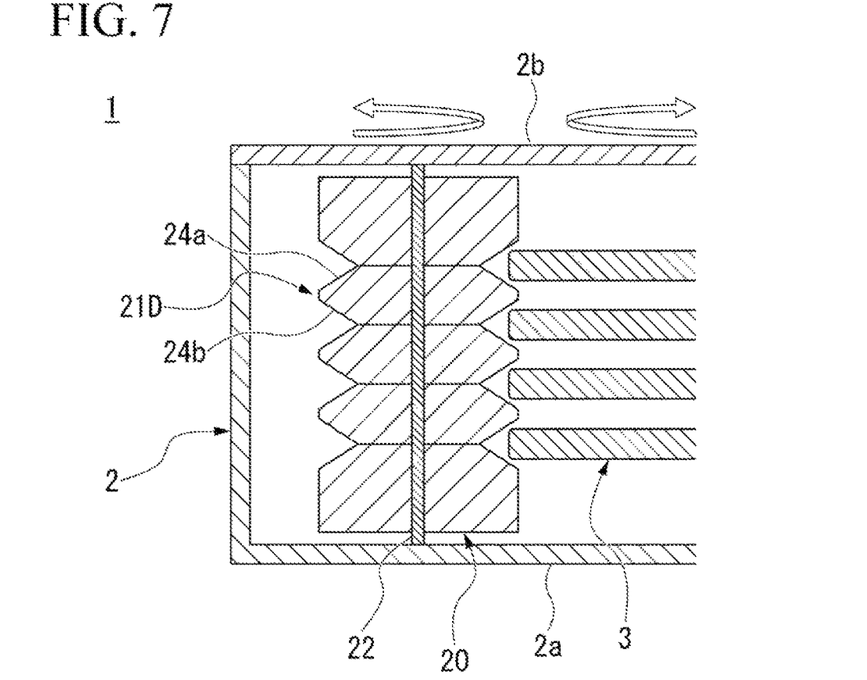
FIG. 7 is a cross-sectional view of a regulating portion shown as a fourth modification.

As a fourth modification, the regulating portion 20 may be configured to include, for example, a regulating member 21D as shown in FIG. 7. FIG. 7 is a cross-sectional view of the regulating portion 20 shown as the fourth modification.

Each of a plurality of regulating members 21D is arranged in the axial direction corresponding to each of the disks 3 arranged in the axial direction. Each regulating member 21D has, on an outer peripheral portion thereof, the pair of contact surfaces 24*a* and 24*b* inclined in opposite directions. That is, the regulating members 21D are formed by dividing the regulating member 21 into parts corresponding to the pairs of contact surfaces 24*a* and 24*b* forming the grooves 23.

The plurality of regulating members 21D are provided to be rotatable independently of each other about an axis parallel to the rotation axis of the disk 3 by being pivotally supported by the support shaft 22 axially penetrating central portions of the regulating members 21D. The spacers 28 for adjusting the intervals between adjacent regulating members 21D, which have been described above with reference to FIG. 6, may be arranged between the adjacent regulating members 21D in each of the plurality of regulating members 21C, as necessary.

According to this configuration, only a regulating member 21D in contact with an outer peripheral edge of a disk 3 can be rotated among the plurality of regulating members 21D and each regulating member 21D can be lightened. Also, the moment of inertia of each regulating member 21D is small.

Thus, the regulating member 21D can better follow the rotation of the disk 3 when in contact with the disk 3 and can further increase the effect of reducing the generation of debris or dust from the contact portion. According to this configuration, it is also possible to more effectively suppress a reduction in the rotation speed of the disk 3 due to the rubbing of the regulating member 21D and the disk 3 against each other.

Fifth Modification

Figure 8:
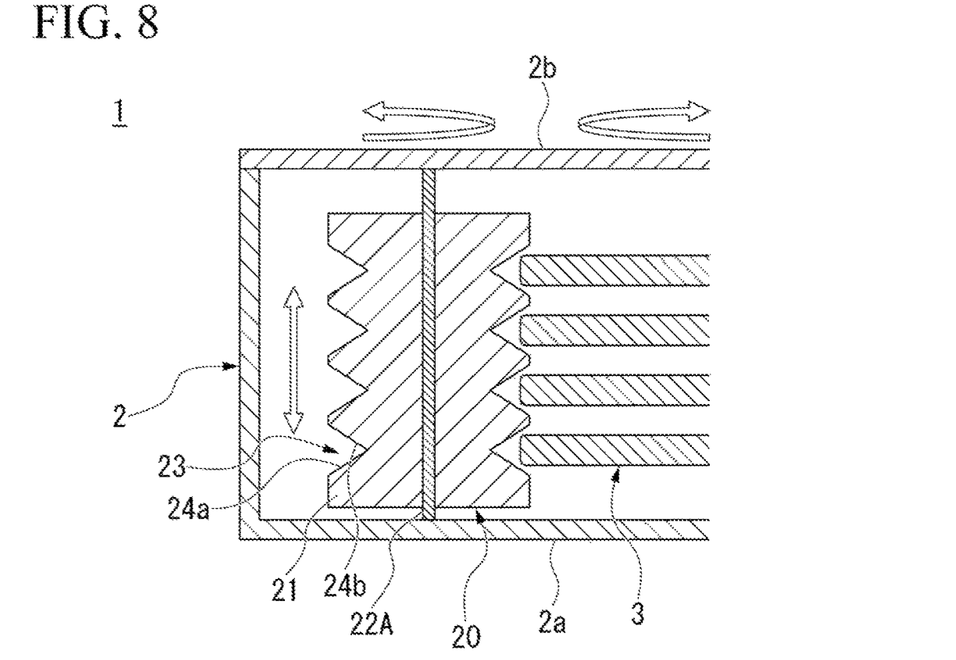
FIG. 8 is a cross-sectional view of a regulating portion shown as a fifth modification.

As a fifth modification, the regulating portion 20 may be configured to include, for example, a regulating member 21 as shown in FIG. 8 which is provided to be movable in an axial direction parallel to the rotation axis of the disk 3. FIG. 8 is a cross-sectional view of the regulating portion 20 shown as the fifth modification.

The regulating member 21 is provided to be movable in an axial direction parallel to the rotation axis of the disk 3 by being pivotally supported by a support shaft 22A longer than the regulating member 21. Since the regulating member 21 is normally positioned on a bottom side of the case body 2*a* due to its own weight, it basically moves upward when it comes into contact with an outer peripheral edge of a disk 3.

Therefore, it is preferable that the distance between a lower surface (back surface) side of the outer peripheral edge of the disk 3 and the contact surface 24*a* of the regulating member 21 contacting the lower surface (back surface) side be longer than the distance between an upper surface (front surface) side of the outer peripheral edge of the disk 3 and the contact surface 24*b* thereof contacting the upper surface (front surface) side.

According to this configuration, when an outer peripheral edge of a rotating disk 3 comes into contact with the regulating member 21, the regulating member 21 moves in the axial direction while following a displacement of the disk 3 due to bending of the disk 3. As a result, it is possible to reduce the generation of debris or dust from the contact portion while suppressing the rubbing of the regulating member 21 and the disk 3 against each other.

Similarly, the regulating members 21A to 21D can also be configured to be movable in an axial direction parallel to the rotation axis of the disk 3.

The regulating members 21, 21A to 21D are not necessarily configured to be rotatable about an axis parallel to the rotation axis of the disk 3 and may be configured to be movable only in an axial direction parallel to the rotation axis of the disk 3.

Sixth Modification

Figure 9:
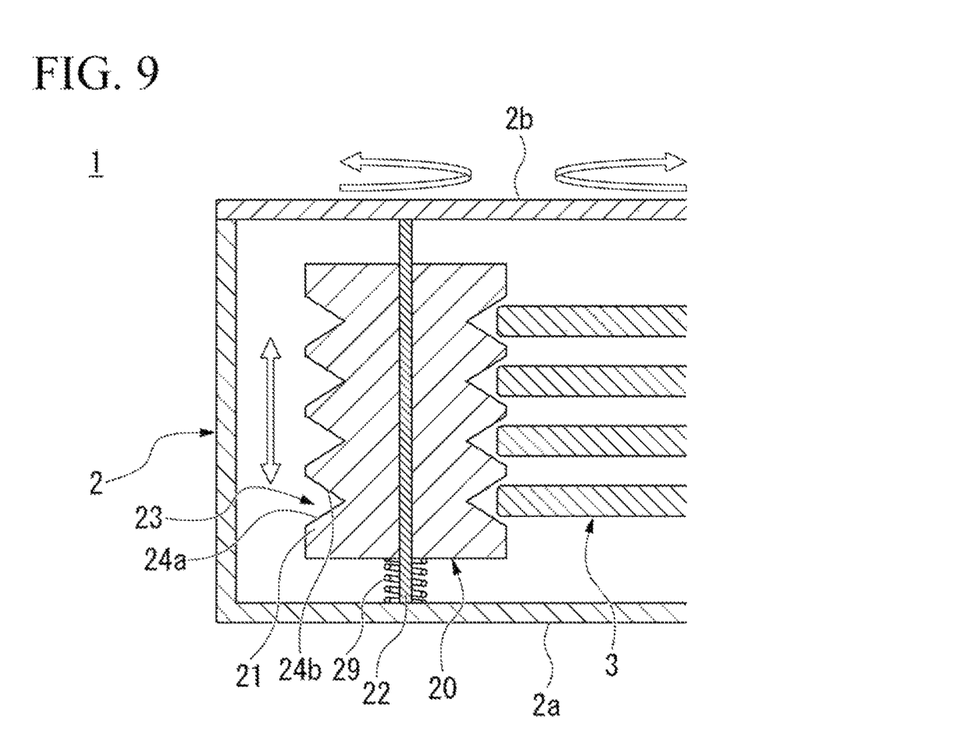
FIG. 9 is a cross-sectional view of a regulating portion shown as a sixth modification.

As a sixth modification, the regulating portion 20 may be configured to include, for example, the regulating member 21 as shown in FIG. 9 which is provided to be movable in an axial direction parallel to the rotation axis of the disk 3 and an energizing member 29 that energizes the regulating member 21 toward one side in an axial direction. FIG. 9 is a cross-sectional view of the regulating portion 20 shown as the sixth modification.

The regulating member 21 is provided to be movable in an axial direction parallel to the rotation axis of the disk 3 by being pivotally supported by the support shaft 22A longer than the regulating member 21. Furthermore, a coil spring serving as an example of the energizing member 29 is arranged between the regulating member 21 and the bottom surface of the case body 2*a* with the support shaft 22A penetrating therethrough in the axial direction.

According to this configuration, when an outer peripheral edge of a rotating disk 3 comes into contact with the regulating member 21, the regulating member 21 moves in the axial direction while following a displacement of the disk 3 due to bending of the disk 3. On the other hand, the regulating member 21 that has moved in the axial direction returns to its original position due to the energizing force of the energizing member 29. As a result, it is possible to reduce the generation of debris or dust from the contact portion while reducing the rubbing of the regulating member 21 and the disk 3 against each other. According to this configuration, it is also possible to more effectively suppress a reduction in the rotation speed of the disk 3 due to the rubbing of the regulating member 21 and the disk 3 against each other.

The energizing member 29 is not necessarily arranged between the regulating member 21 and the bottom surface of the case body 2*a* on one side of the regulating member 21 in the axial direction, as described above, the energizing member 29 may be arranged between the regulating member 21 and the lid 2*b* on the other side of the regulating member 21 in the axial direction, and the energizing member 29 may also be arranged on both sides thereof.

Similarly, the regulating members 21A to 21D can also be configured to be movable in an axial direction parallel to the rotation axis of the disk 3 and provided with the energizing member 29 that energizes the regulating member 21 toward one side in an axial direction.

The regulating members 21, 21A to 21D are not necessarily configured to be rotatable about an axis parallel to the rotation axis of the disk 3 and may be configured to be movable only in an axial direction parallel to the rotation axis of the disk 3.

Seventh Modification

Figure 10:
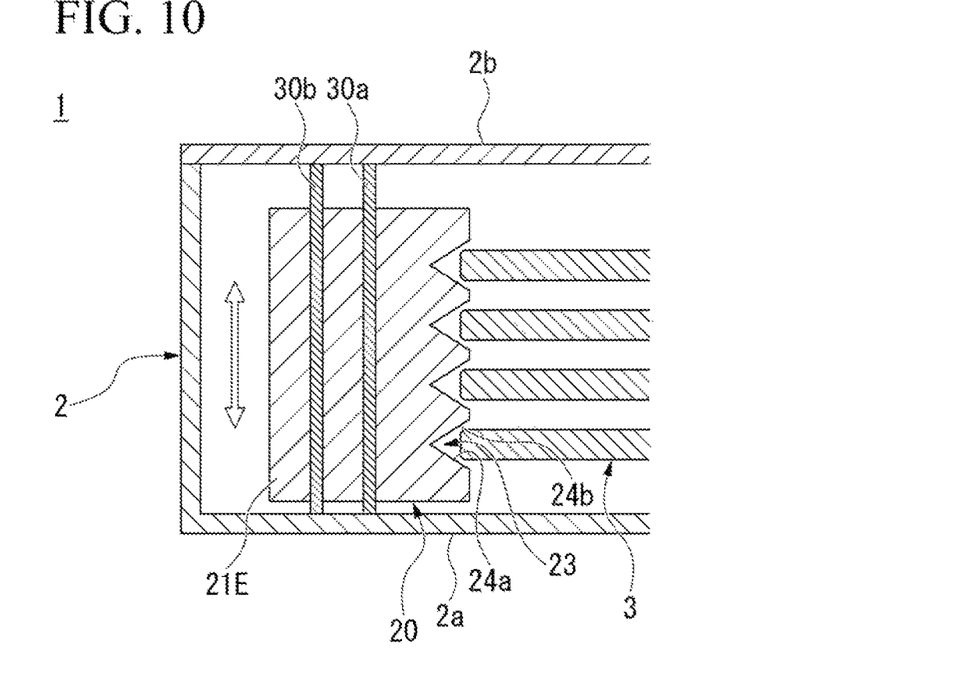
FIG. 10 is a cross-sectional view of a regulating portion shown as a seventh modification.

As a seventh modification, the regulating portion 20 may be configured to include, for example, a regulating member 21E as shown in FIG. 10. FIG. 10 is a cross-sectional view of the regulating portion 20 shown as the seventh modification.

The regulating member 21E is provided to be movable only in an axial direction parallel to the rotation axis of disks 3 by being supported by a pair of support shafts 30a and 30b longer than the regulating member 21E.

A side surface of the regulating member 21E facing the outer peripheral edge of each disk 3 forms a concave curved surface carved in an arc shape along the outer shape of the disk 3 in a plane view. The side surface of the regulating member 21E facing the outer peripheral edge of the disk 3 is not limited to such a concave curved surface and may be a convex curved surface or a flat surface.

The grooves 23 having the pairs of contact surfaces 24a and 24b are arranged in the axial direction on the side surface of the regulating member 21E facing the outer peripheral edges of the disks 3.

Furthermore, other side surface of the regulating member 21E excluding the side surface of the regulating member 21E facing the outer peripheral edge of each disk 3 may form a flat surface. The other side surface of the regulating member 21E is not limited to such the flat surface.

According to this configuration, when an outer peripheral edge of a rotating disk 3 comes into contact with the regulating member 21E, the regulating member 21E moves in the axial direction while following a displacement of the disk 3 due to bending of the disk 3. As a result, it is possible to reduce the generation of debris or dust from the contact portion while reducing the rubbing of the regulating member 21E and the disk 3 against each other. According to this configuration, it is also possible to more effectively suppress a reduction in the rotation speed of the disk 3 due to the rubbing of the regulating member 21E and the disk 3 against each other.

Eighth Modification

Figure 11:
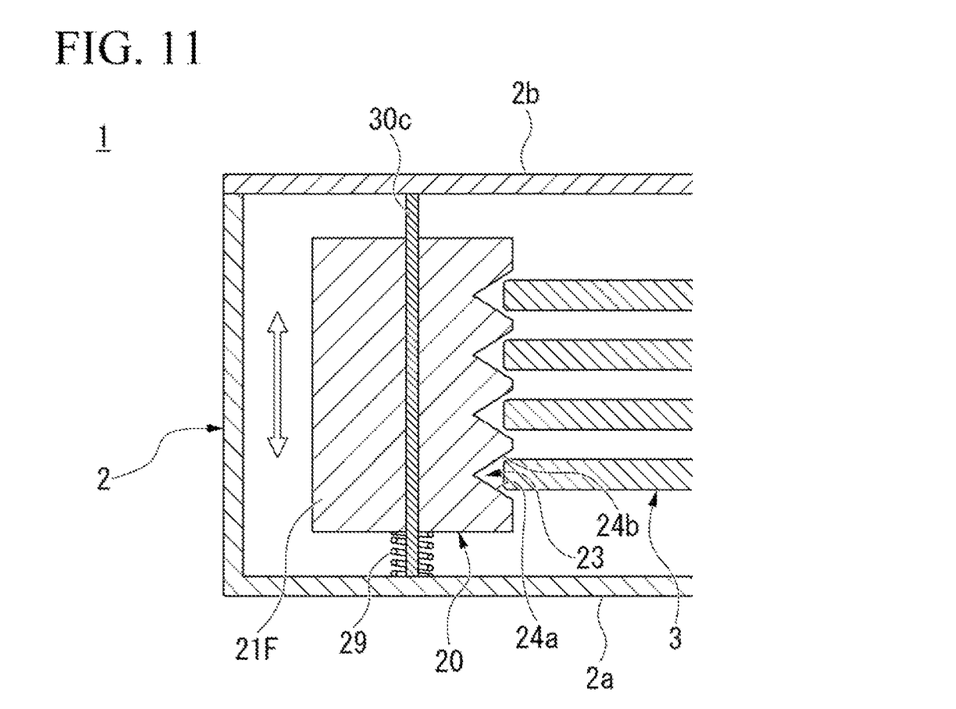
FIG. 11 is a cross-sectional view of a regulating portion shown as an eighth modification.

As an eighth modification, the regulating portion 20 may be configured to include, for example, a regulating member 21F as shown in FIG. 11 which is provided to be movable in an axial direction parallel to the rotation axis of the disk 3 and the energizing member 29 that energizes the regulating member 21F toward one side in an axial direction. FIG. 11 is a cross-sectional view of the regulating portion 20 shown as the eighth modification.

The regulating member 21F may have the same configurations of the regulating member 21E.

The regulating member 21F is provided to be movable in an axial direction parallel to the rotation axis of the disk 3 by being supported by a support shaft 30c longer than the regulating member 21F. A coil spring serving as an example of the energizing member 29 is arranged between the regulating member 21F and the bottom surface of the case body 2a with the support shaft 30c penetrating therethrough in the axial direction.

According to this configuration, when an outer peripheral edge of a rotating disk 3 comes into contact with the regulating member 21F, the regulating member 21F moves in the axial direction while following a displacement of the disk 3 due to bending of the disk 3. On the other hand, the regulating member 21F that has moved in the axial direction returns to its original position due to the energizing force of the energizing member 29. As a result, it is possible to reduce the generation of debris or dust from the contact portion while reducing the rubbing of the regulating member 21F and the disk 3 against each other. According to this configuration, it is also possible to more effectively suppress a reduction in the rotation speed of the disk 3 due to the rubbing of the regulating member 21F and the disk 3 against each other.

The energizing member 29 is not necessarily arranged between the regulating member 21F and the bottom surface of the case body 2a on one side of the regulating member 21F in the axial direction, as described above, the energizing member 29 may be arranged between the regulating member 21F and the lid 2b on the other side of the regulating member 21F in the axial direction, and the energizing member 29 may also be arranged on both sides thereof.

(Others)

The grooves 23 and 27 are not necessarily arranged adjacent to each other in the axial direction and may be arranged at intervals in the axial direction.

The regulating members 21, 21A to 21F are not necessarily supported directly on the support shafts 22, 22A, 30a, 30b, and 30c and may be supported on the support shafts 22, 22A, 30a, 30b, and 30c via another member such as a bearing.

Figure 12A:
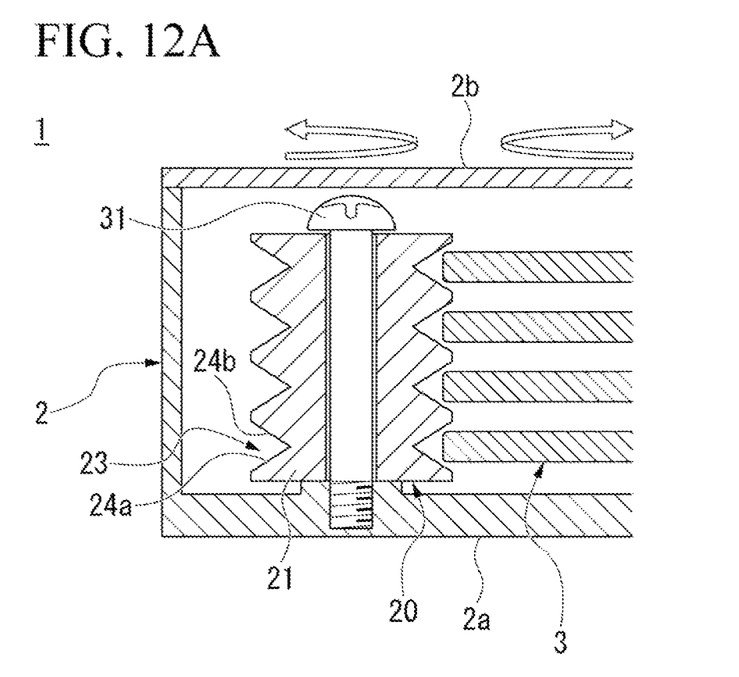
FIG. 12A is a cross-sectional view illustrating a mounting structure of a regulating member.
Figure 12B:
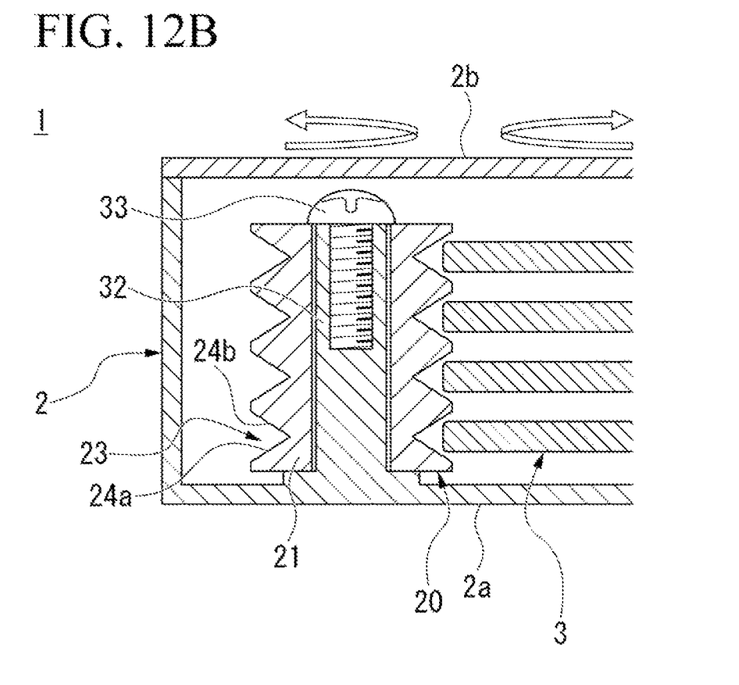
FIG. 12B is a cross-sectional view illustrating a mounting structure of a regulating member.

Further, the mounting structure of the regulating member 21, 21A to 21F is not limited to the above-described configuration in which the regulating member 21, 21A to 21F is pivotally supported by the support shaft 22, 22A, 30a, 30b, or 30c and may employ a configuration in which the regulating member 21 is rotatably attached to the case body 2a with a screw 31 screwed to the case body 2a as a support shaft as shown in FIG. 12A or a configuration in which the regulating member 21 is rotatably attached to a boss 32 projecting from the case body 2a as a support shaft as shown in FIG. 12B. A screw 33 is screwed to a distal end of the boss 32 to prevent it from coming off.

In the configurations illustrated in FIGS. 12A and 12B above, it is preferable that the diameters of the heads of the screws 31 and 33 be larger than the diameter of a through-hole of the regulating member 21. This is to prevent the regulating member 21 from moving in the vertical direction more than necessary and to prevent the regulating member 21 from coming off. It is preferable that the distances between the bearing surfaces of the screws 31 and 33 and the surface of the case body 2a facing the bearing surfaces be longer than the length of the regulating member 21 in the vertical direction. This is to reduce the friction acting on the regulating member 21.

Figure 13:
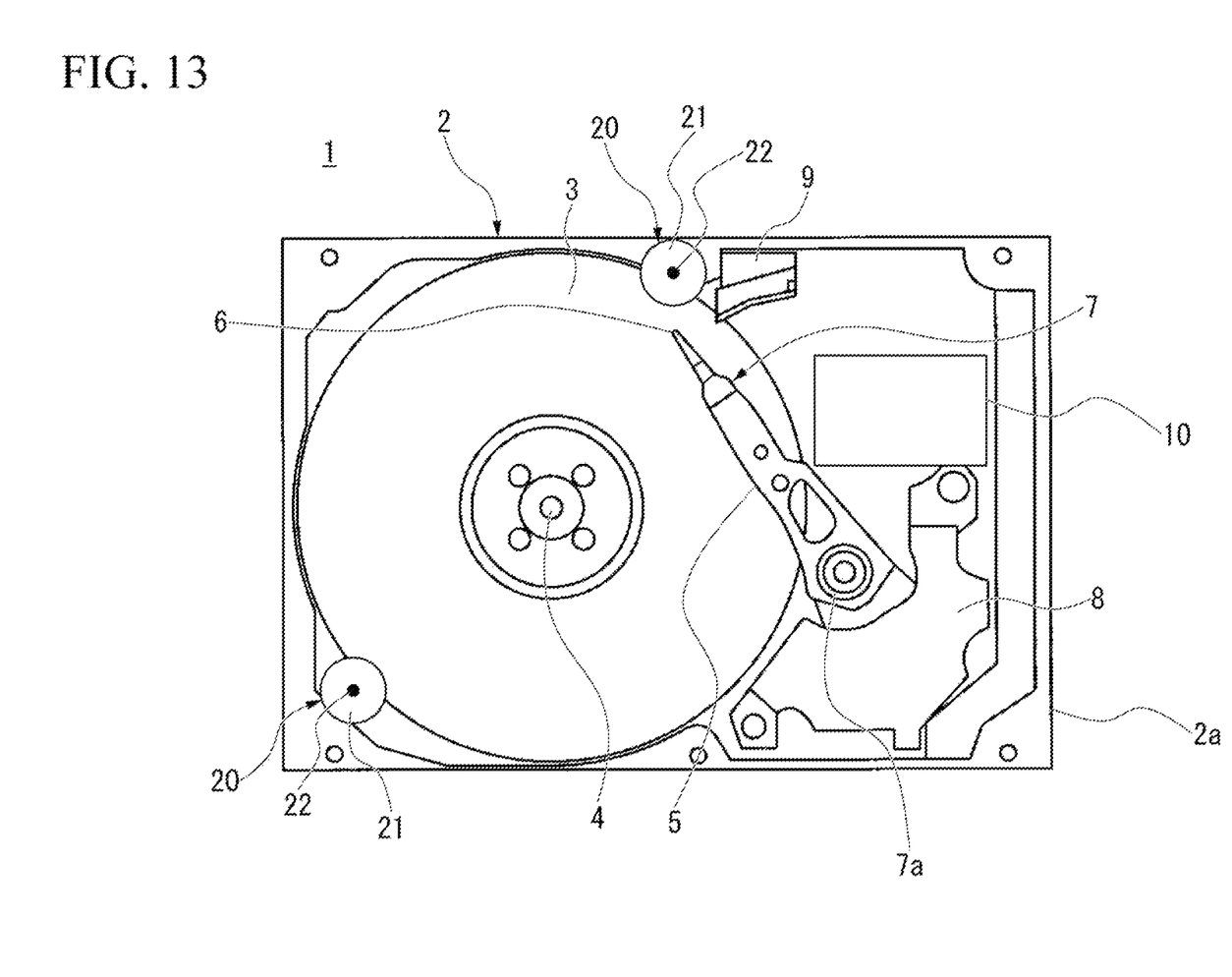
FIG. 13 is a plan view showing a configuration in which regulating portions are provided at a plurality of positions in a recording and reproducing device.

In the recording and reproducing device 1 described above, the regulating portion 20 is provided at least one position in the circumferential direction of the disk 3. On the other hand, the regulating portions 20 may be provided at a plurality of positions (two positions in FIG. 13) in the circumferential direction of the disk 3 as shown in FIG. 13. When the regulating portions 20 are provided at a plurality of positions, it is also preferable that the regulating portions 20 be arranged in the circumferential direction of the disk 3 at regular intervals. As a result, when an external shock, vibration, or the like is applied to the disk 3, it is possible to regulate displacements of the disk 3 due to bending of the disk 3 over a wider range.

What is claimed is:

1. A recording and reproducing device comprising:
a case;
a plurality of recording mediums having a disk-shape, a motor configured to rotate the plurality of recording mediums, a head configured to read or write information from or to a corresponding one of the plurality of recording mediums, and an actuator configured to drive the head to scan in a radial direction of the corresponding one of the plurality of recording mediums which are provided in the case; and
a regulating portion configured to, when an external shock is applied to the plurality of recording mediums, contact an outer peripheral edge of each of the plurality of recording mediums to regulate displacements of each of the plurality of recording mediums due to bending of each of the plurality of recording mediums,
wherein the regulating portion includes a regulating member which is movable in an axial direction parallel to a rotation axis of the plurality of recording mediums,
the plurality of recording mediums are arranged in the axial direction parallel to the rotation axis, and
a plurality of pairs of inclined surfaces are arranged on an outer peripheral edge of the regulating member in the axial direction parallel to the rotation axis corresponding to each of the plurality of recording mediums.

2. The recording and reproducing device according to claim 1, wherein the regulating member has a plurality of pairs of contact surfaces facing the outer peripheral edge of each of the plurality of recording mediums, and
each of the pairs of contact surfaces are inclined in opposite directions with the outer peripheral edge of each of the plurality of recording mediums interposed therebetween, and
the plurality of pairs of contact surfaces are the plurality of pairs of inclined surfaces.

3. The recording and reproducing device according to claim 1, wherein the regulating portion includes an energizing member configured to energize the regulating member toward one side in the axial direction.

4. The recording and reproducing device according to claim 1, wherein the regulating member is pivotally supported by a support shaft parallel to the rotation axis of the plurality of recording mediums.

5. The recording and reproducing device according to claim 1, wherein each of a plurality of regulating portions is provided at each of a plurality of positions in a circumferential direction of the plurality of recording mediums.

6. The recording and reproducing device according to claim 1, wherein each of the plurality of recording mediums has a diameter of 90 mm or more and a thickness of 0.550 mm or less.

7. The recording and reproducing device according to claim 1,
wherein each of the plurality of pairs of inclined surfaces is arranged so as to be associated with each of the plurality of recording mediums.

8. A recording and reproducing device comprising:
a case;
a plurality of recording mediums having a disk-shape, a motor configured to rotate the plurality of recording mediums, a head configured to read or write information from or to a corresponding one of the plurality of recording mediums, and an actuator configured to drive the head to scan in a radial direction of the corresponding one of the plurality of recording mediums which are provided in the case; and
a regulating portion configured to, when an external shock is applied to the plurality of recording mediums, contact an outer peripheral edge of each of the plurality of recording mediums to regulate displacements of each of the plurality of recording mediums due to bending of each of the plurality of recording mediums,
wherein the regulating portion includes a plurality of regulating members which are movable in an axial direction parallel to a rotation axis of the plurality of recording mediums,
each of the plurality of regulating members is arranged in the axial direction so as to be associated with each of the plurality of recording mediums arranged in the axial direction, and
the plurality of regulating members are provided to be rotatable independently of each other around an axis parallel to the rotation axis.

9. A recording and reproducing device comprising:
a case;
a plurality of recording mediums having a disk-shape, a motor configured to rotate the plurality of recording mediums, a head configured to read or write information from or to a corresponding one of the plurality of recording mediums, and an actuator configured to drive the head to scan in a radial direction of the corresponding one of the plurality of recording mediums which are provided in the case; and
a regulating portion configured to, when an external shock is applied to the plurality of recording mediums, contact an outer peripheral edge of each of the plurality of recording mediums to regulate displacements of each of the plurality of recording mediums due to bending of each of the plurality of recording mediums,
wherein the regulating portion includes a regulating member which is movable in an axial direction parallel to a rotation axis of the plurality of recording mediums,
the regulating member includes a cylindrical roller portion, a cylindrical hub portion positioned at a center of the roller portion, and a plurality of spoke portions that radially connect the roller portion and the hub portion, and
the regulating member is provided to be rotatable around an axis parallel to the rotation axis by being pivotally supported by a support shaft axially penetrating the hub portion.

* * * * *